United States Patent [19]
Horwitz et al.

[11] Patent Number: 5,851,401
[45] Date of Patent: Dec. 22, 1998

[54] METHOD FOR THE CHROMATOGRAPHIC SEPARATION OF CATIONS FROM AQUEOUS SAMPLES

[75] Inventors: E. Philip Horwitz, Naperville; Renato Chiarizia, Elmhurst; Mark L. Dietz, Evanston, all of Ill.

[73] Assignee: Eichrom Industries, Inc., Darien, Ill.

[21] Appl. No.: 853,593

[22] Filed: May 9, 1997

Related U.S. Application Data

[62] Division of Ser. No. 467,402, Jun. 6, 1995, Pat. No. 5,651,883.

[51] Int. Cl.$^6$ .................................................... B01D 15/08
[52] U.S. Cl. ...................... 210/635; 210/656; 210/198.2; 210/502.1
[58] Field of Search .................... 210/634, 635, 210/656, 198.2, 502.1; 96/101; 502/400, 401; 428/403, 404, 407

[56] References Cited

U.S. PATENT DOCUMENTS

| | | | |
|---|---|---|---|
| 4,548,790 | 10/1985 | Horwitz et al. | 423/9 |
| 4,574,072 | 3/1986 | Horwitz et al. | 423/9 |
| 4,835,107 | 5/1989 | Horwitz et al. | 436/82 |
| 4,842,935 | 6/1989 | Shinbo | 428/404 |
| 4,957,620 | 9/1990 | Cussler | 210/635 |
| 5,100,585 | 3/1992 | Horwitz | 210/682 |
| 5,281,631 | 1/1994 | Horwitz et al. | 521/38 |
| 5,332,531 | 7/1994 | Horwitz | 588/20 |
| 5,346,618 | 9/1994 | Horwitz | 210/198.2 |

OTHER PUBLICATIONS

Burger et al., *J. Am. Chem. Soc.*, 79:3575–3579 (1957).

*Primary Examiner*—Ernest G. Therkorn
*Attorney, Agent, or Firm*—Welsh & Katz, Ltd.

[57] ABSTRACT

An extraction chromatographic material for extracting metal cations from a liquid stream. The extraction chromatographic material is prepared by adsorbing a diesterified methanediphosphonic acid on an inert particulate support.

6 Claims, 5 Drawing Sheets

METHOD FOR THE CHROMATOGRAPHIC SEPARATION OF CATIONS FROM AQUEOUS SAMPLES

This is a division of application Ser. No. 08/467,402, filed Jun. 6, 1995, now U.S. Pat. No. 5,651,883. +gi The U.S. Government has rights in this invention pursuant to Contract No. W-31-109-END-38 between the U.S. Department of Energy and Argonne National Laboratory.

BACKGROUND OF THE INVENTION

The invention is related to a method and composition of matter for the concentration and separation of trivalent, tetravalent and hexavalent elements, such as actinide and/or lanthanide values, from samples containing these and other elements. More specifically, the invention relates to a method and apparatus for the quantitative recovery of actinide and/or lanthanide values from biological and environmental samples. Still, more specifically, this invention relates to a new extraction chromatographic resin which is especially suitable for the extraction of trivalent, tetravalent and hexavalent actinides (Th, U, Np, Pu, Am, and Cm) and/or lanthanides from soils, surface and ground waters and bioassay samples and for the isolation of radium from environmental samples.

The recovery and isolation of radionuclides from environmental and bioassay samples is complicated by the presence of silica, aluminum and iron (III) as well as other frequently present ions such as titanium, bismuth and phosphate. The isolation of the actinides, lanthanides and radium from such samples in the past has involved time-consuming, expensive and sometimes hazardous procedures.

A number of previously described procedures for the determination of the actinide plutonium in urine, for example, involved preconcentration of small amounts of Pu from the vast excess of matrix substances present in urine samples by precipitation reactions, adsorption on glass fibre, extraction, extraction chromatography or ion exchange. Of these, precipitation reactions appear to provide the most satisfactory results.

However, such methods are complex, time consuming and relatively expensive.

U.S. Pat. No. 4,548,790 dated Oct. 22, 1985 describes a group of neutral bifunctional organophosphorus compounds broadly described as alkyl(phenyl)-N,N-dialkylcarbamoylmethylphosphine oxides (hereinafter referred to as CMPO) which are useful for the recovery of actinide and lanthanide values from acidic solutions containing these and other metal values. The combination of the CMPO extractants with a phase modifier such as tri-n-butyl phosphate in a normal paraffin hydrocarbon diluent is described in U.S. Pat. No. 4,574,072. U.S. Pat. No. 4,835,107 describes passing samples in a mineral acid solution through a separation column of an alkyl(phenyl)-N,N-dialkylcarbamoylmethylphosphine oxide dissolved in tri-n-butyl phosphate on an inert support to selectively recover actinides. These patents are assigned to the common assignee and are incorporated herein by reference.

SUMMARY OF THE INVENTION

The subject invention comprises a method of using a composition of matter which includes a liquid diphosphonic acid extractant belonging to the class of diesterified methanediphosphonic acids which is adsorbed onto an inert support. The extraction resin of the subject invention has extraordinarily strong affinity for actinides and lanthanides in the tri-, tetra- and hexavalent oxidation states from highly acidic media, even in the presence of complexing anions such as fluoride, oxalate and phosphate, and has a strong affinity for radium, even in the presence of other alkaline earth ions, e.g., Ca, Sr, and Ba. The active component of the subject invention is a liquid diphosphonic acid extractant belonging to the class of diesterified methanediphosphonic acids as shown below:

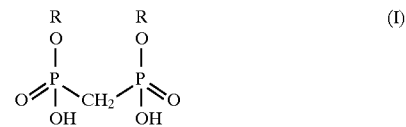

Certain soil or fecal samples contain siliceous material which requires digestion with hydrofluoric acid to react with silicon dioxide to form gaseous $SiF_4$ and water, and require a substantial period of time to digest the $SO_2$ and special equipment because of the presence of hydrofluoric acid. The affinity of the extraction resin of the subject invention for the actinides and lanthanides combined with the ability to isolate the samples in the presence of complexing acids permits the use of excess hydrofluoric acid to form $H_2SiF_6$ which will pass through the chromatographic column. The extractant resin can isolate actinides and lanthanides from a quantity of water without the use of a column simply by adding a quantity of the extraction resin to the water sample for a short period of time and then recovering the resin. The actinides are stripped from the column with an alcohol such as isopropanol which also removes the diphosphonic acid extractant from the surface of the support. The actinides are then recovered by destroying the extractant. The extractant resin of the subject invention can also be used to recover radium from water and other samples which are difficult with present separation techniques.

DETAILED DESCRIPTION OF THE INVENTION

The active component of the extractant resin of the subject invention is a liquid diphosphonic acid of the general formula (I), with R=alkyl or aryl, C=6–18. A preferred compound is bis-2-ethylhexyl methanediphosphonic acid (hereinafter $H_2DEH[MDP]$).

The active component may be mixed with a lower boiling organic solvent such as methanol, ethanol, acetone, diethyl ether, methyl ethyl ketones, hexanes, or toluene and coated onto an inert support, such as glass beads, polypropylene beads, polyester beads or silica gel as known in the art for use in a chromatographic column and the sample eluted as set forth in the examples. Acrylic and polyaromatic resins such as those available under the AMBERLITE trademark from Rohm and Haas, Philadelphia, Pa. may also be used. In the alternative, a liquid - liquid extraction method may be used, if the diphosphonic acid is dissolved in an organic solvent such as xylene, kerosene, or higher alcohols (C=4–10). Higher boiling aromatics such as diethyl benzene, diisopropyl benzene and t-butyl benzene may be also be used.

Figure 1B:
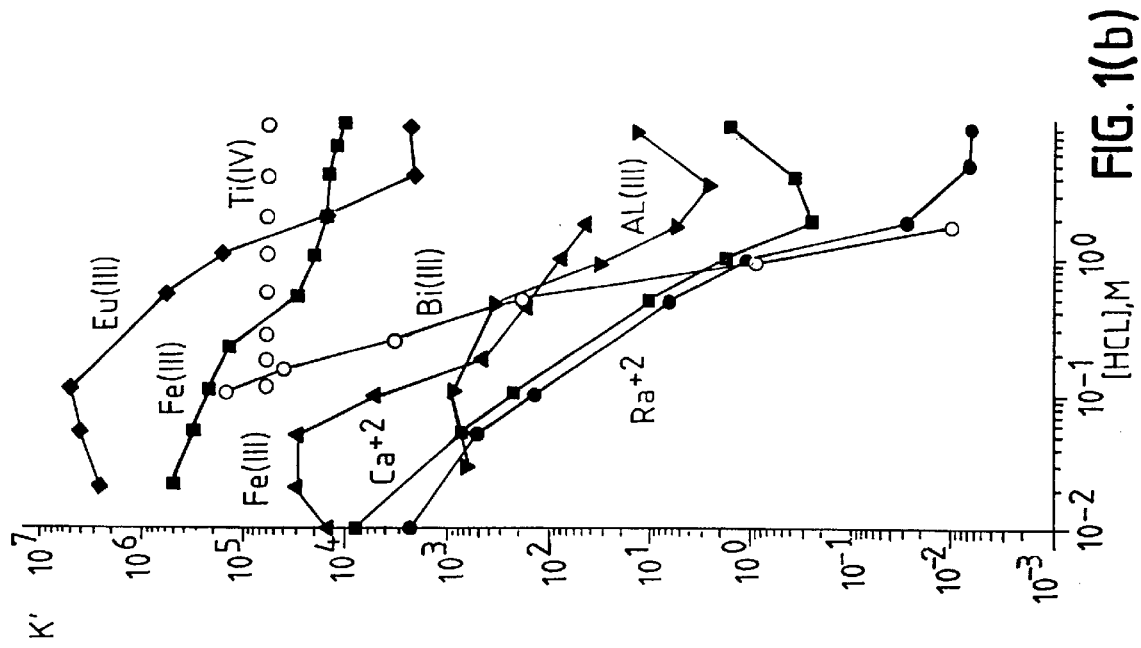
FIGS. 1(a) and 1(b) depict the uptake of various cations by the extractant resin of the subject invention.
Figure 1A:
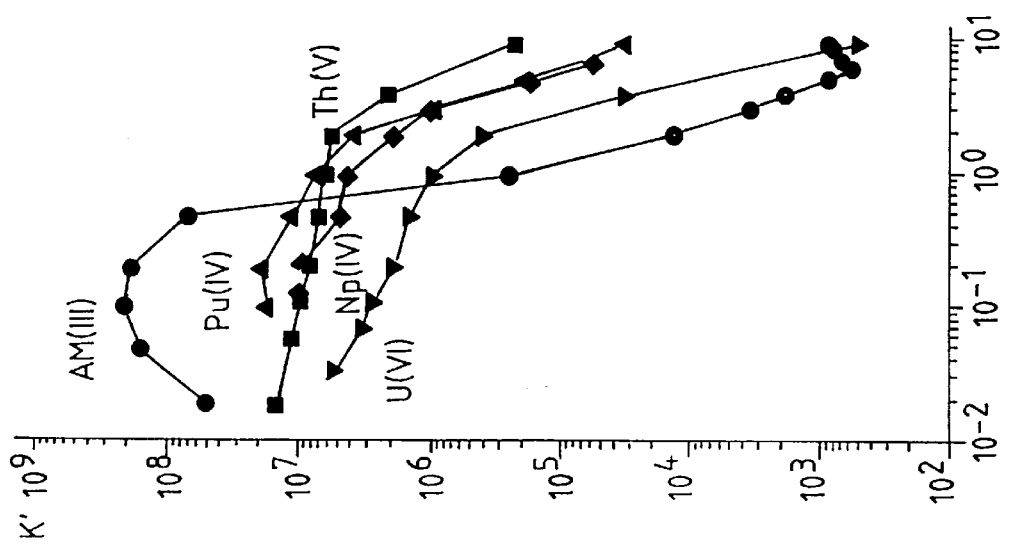
Figures 2A, 2B:
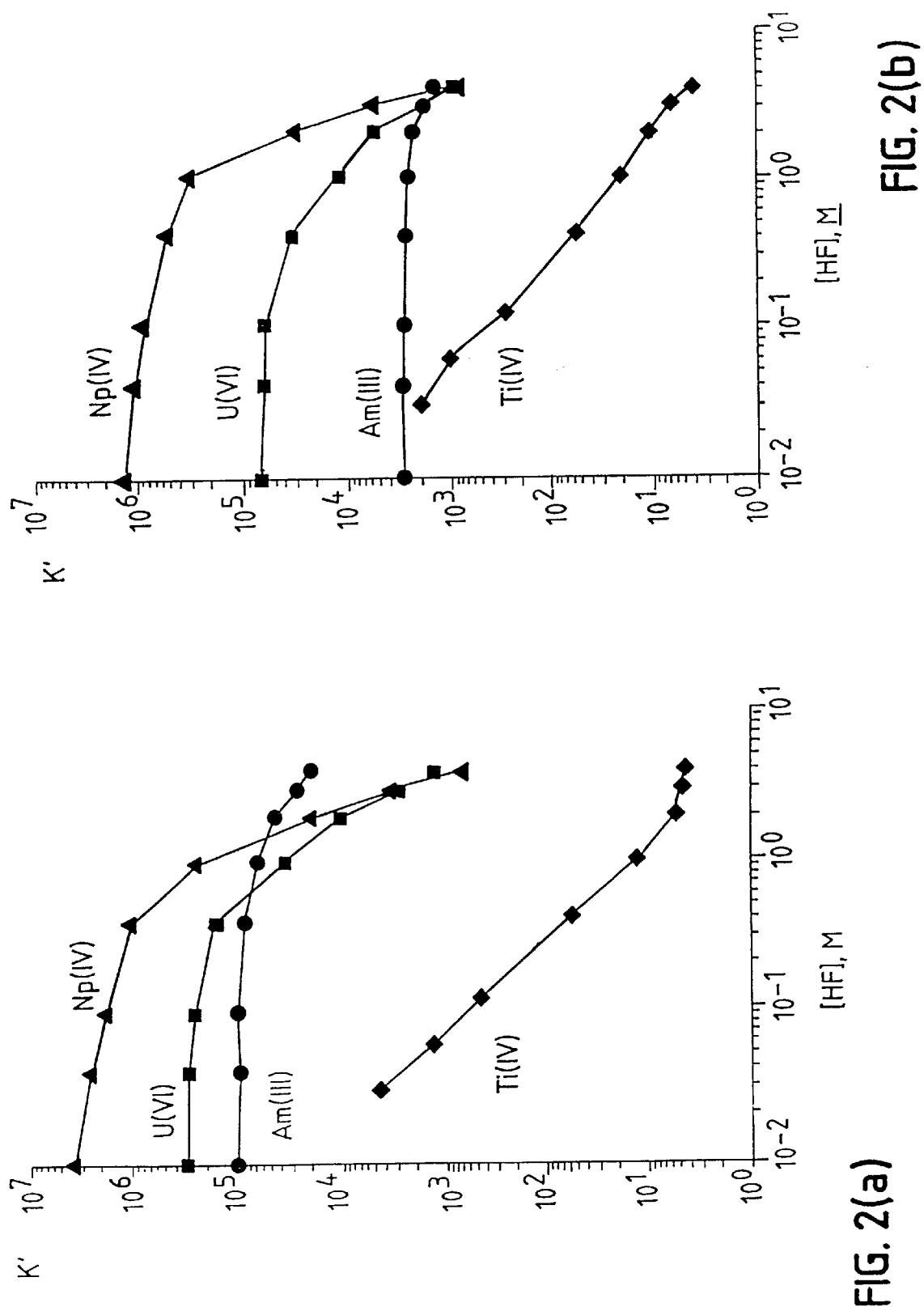
FIGS. 2(a) and (b) depict the effect of HF concentration on the uptake of various actinides by the extractant resin of the subject invention.
Figure 3:
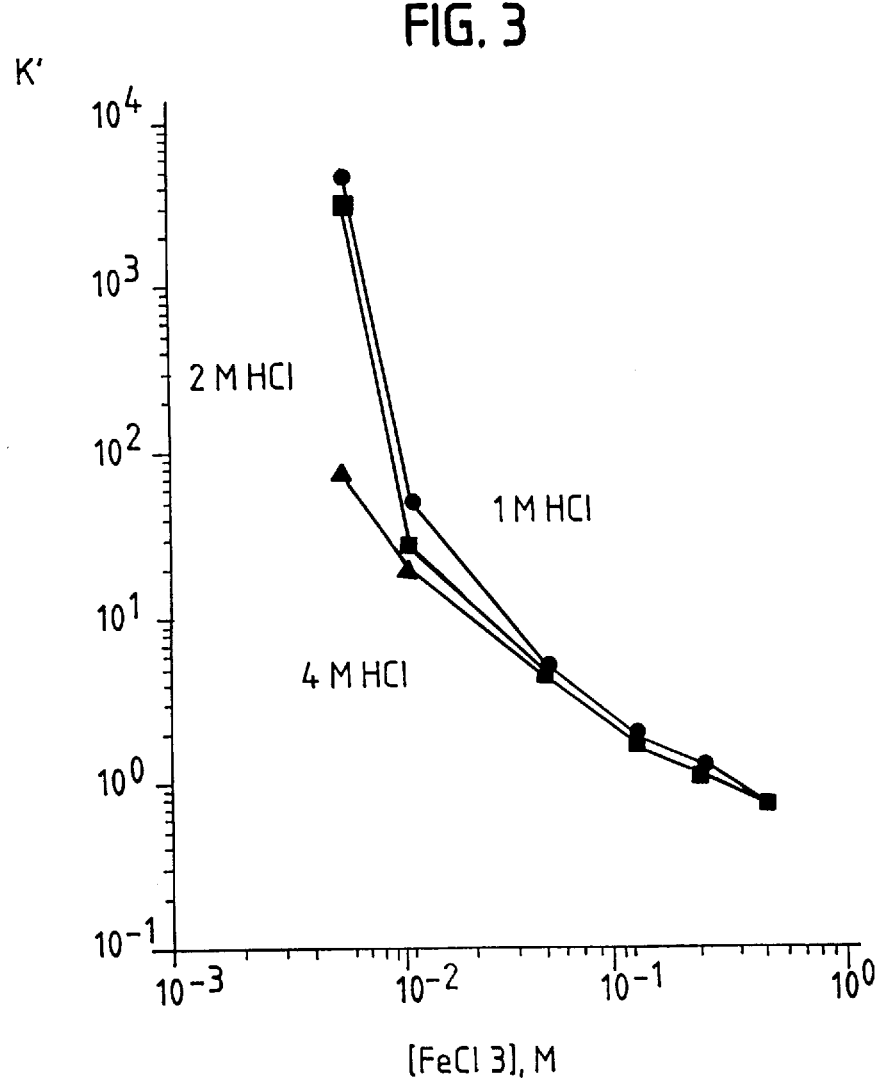
FIG. 3 shows the effect of Fe(III) on the uptake of Am(III) at different acid concentrations.

FIGS. 1 through 3 illustrate a number of the important properties of the extractive resin of the subject invention. FIG. 1(a) depicts the extraordinarily strong retention of actinides in the tri-, tetra-, and hexavalent oxidation state over a wide range of HCl concentrations. The term k' is a measure of how strongly a given element will be retained on a column. k' is related to the distribution ratio, D, (conc. in the organic/conc. in aqueous phase) by the equation k'=D $v_s/v_m$, where $v_s$ and $v_m$ are the volumes of stationary and mobile phases, respectively.

FIG. 1(b) shows the high retention of Ra at low acidities. Corresponding data for Ra uptake on the commercially available and widely used extraction chromatographic system employing bis-2-ethylhexyl phosphoric acid shows k' values one hundred times higher than those for Ra. Other noteworthy features of the data in FIG. 1(b) are the lower k' values of $Fe^{3+}$ and $Al^{3+}$ relative to actinides than are found for sulfonated diphosphonic acid polymers. This is an important feature of the subject extractant resin, particularly in the case of Al, because there will be less interference from Al when isolating actinides from soils. The data in FIG. 2 highlight the fact that k' values for selected actinides in three different oxidation states remain high even in the presence of high concentrations of hydrofluoric acid, whereas Ti, a troublesome constituent in soil analyses, is not significantly retained.

Figure 4:
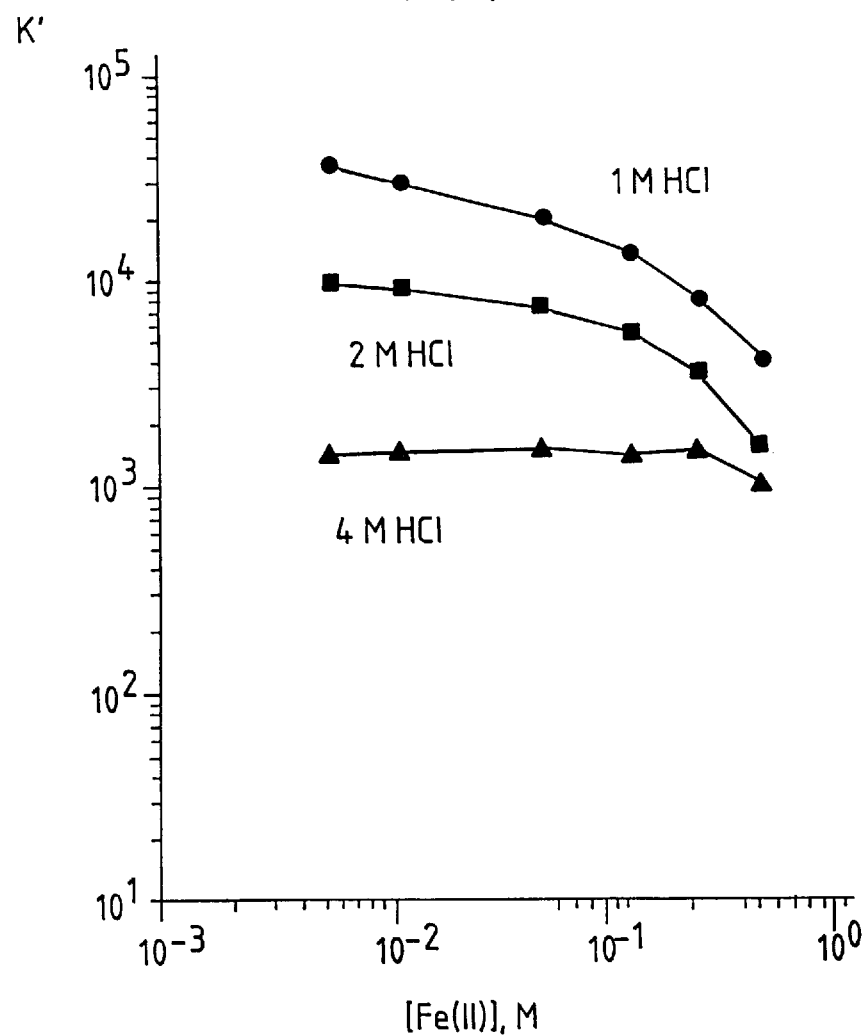
FIG. 4 shows the effect of Fe(II) on the uptake of Am(III) at different acid concentrations.
Figure 5:
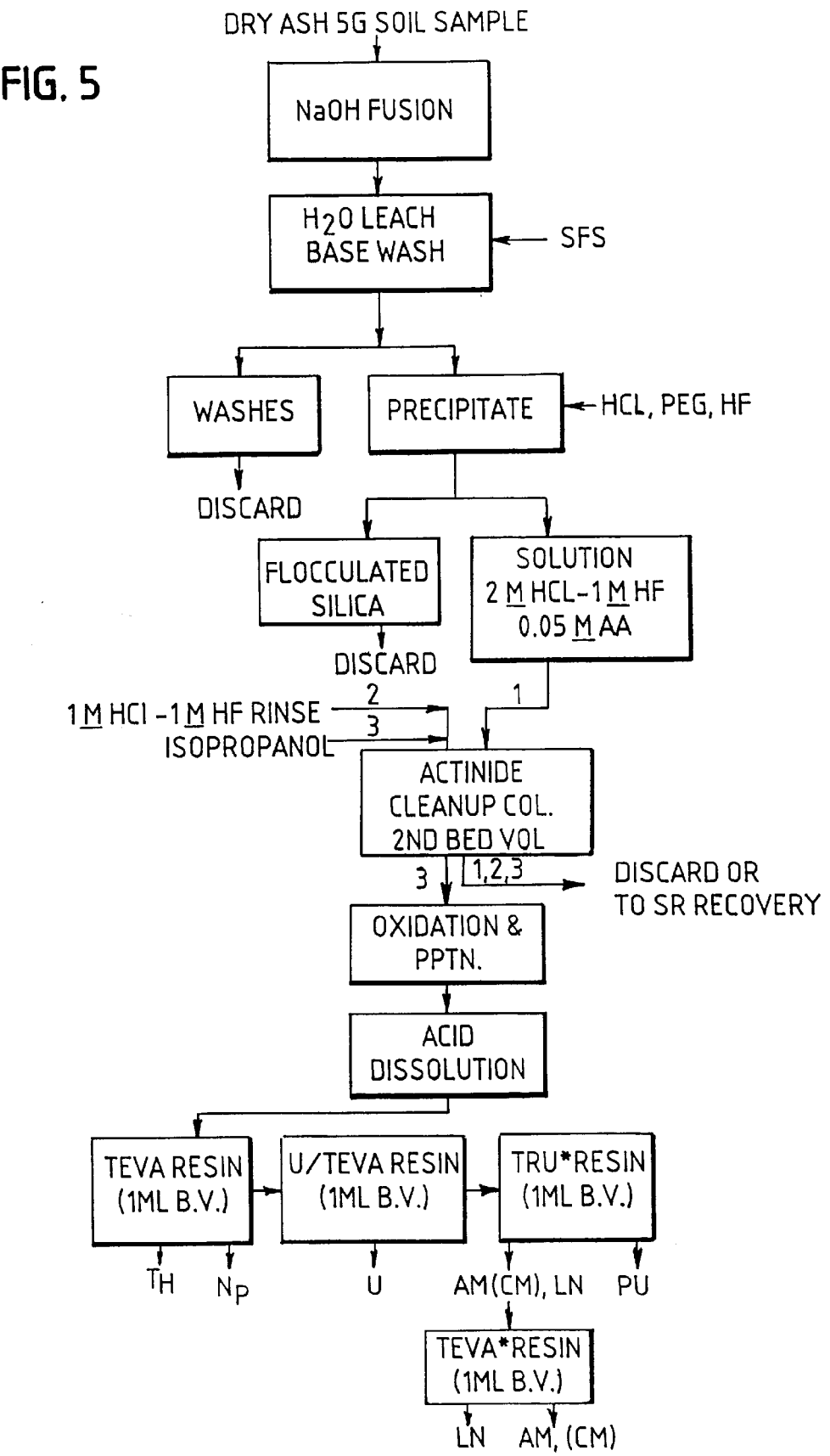
FIG. 5 depicts a method of separating actinides according to the subject invention.

One of the major interferences in the uptake of actinides by the subject invention is the presence of macroconcentrations of Fe(III). High concentrations of iron are routinely confronted in soil analyses. The data in FIG. 3 show that even modest concentrations of Fe(III) suppress $k'_{Am}$ to levels that would interfere with the uptake of Am. However, if Fe(III) is reduced to Fe(II), then high concentration of Fe can be present without reducing significantly $k'_{Am}$ (see FIG. 4). The reduction of Fe(III) to Fe(II) is readily achieved in chloride media, in the presence of a reducing agent, such as ascorbic acid.

The method of recovery of the actinides from the resin of the subject invention is one of its novel features. With k' values for actinides highly elevated, eluting or stripping the elements from the subject resin using concentrated mineral acids is not feasible. In the case of prior art ion exchange resins such as the sulfonated diphosphonic acid polymer as described in U.S. Pat. No. 5,281,631, actinides are stripped from columns using a chelating agent containing the same type of ligand that is bonded in the polymer matrix, namely a geminally substituted diphosphonic acid. More specifically, a 0.5M solution 1-hydroxyethane-1, 1-diphosphonic acid (HEDPA) is used to elute actinides in the tri-, tetra-, and hexavalent oxidation states in 10 to 15 free column volumes. The HEDPA must then be decomposed to phosphoric and sulfuric acids and the actinides coprecipitated into a calcium phosphate matrix. The calcium phosphate is then dissolved in nitric acid and further processed. Another alternative method of recovery that has been employed recently is to extrude the resin from the column and decompose the resin in much the same way as HEDPA. Both decomposition procedures (either HEDPA or resin) are time consuming and cumbersome.

With the subject resin, as depicted in FIG. 6, one needs only to elute the column with an alcohol (isopropanol is favored though methanol, ethanol and butanol may also be used) and the entire $H_2DEH[MDP]$ stationary phase is efficiently and quantitatively removed in approximately 5 to 10 free column volumes. Since the volume of $H_2DEH[MDP]$ is only 15% of the bed volume of a column, a 1 ml bed volume column of the subject resin contains only ~150 $\mu L$ of extractant. The resultant $H_2DEH[MDP]$ in alcohol is readily destroyed by first evaporating the alcohol and then oxidizing the small volume of extractant with $H_2O_2$ to phosphoric acid. The actinides are then easily recovered from the resultant residue of phosphoric acid by addition of nitric acid and loading onto one of several actinide specific extraction chromatographic columns, e.g., TRU™ resin. Thus, the subject invention has the major advantage over the prior art sulfonated diphosphonic acid polymer that the complexing reagent itself can be eluted from the column and readily destroyed, making quantitative recovery of the analyte easily attainable.

In the case of Ra, recovery from the subject resin is readily achieved using 1M HCl or $HNO_3$ because $k_{Ra}$, decreases significantly with increasing acidity. This, again, is an important feature because analysts frequently are required to measure $^{228}Ra$ in addition to the long lived $^{226}Ra$. Radium-228 is a beta emitter that decays to 6.13 hour $^{228}Ac$. Once the Ra is eluted, a new growth period for $^{228}Ac$ begins because Ac is strongly retained like Am and Eu. After the $^{228}Ac$ is in secular equilibrium with $^{228}Ra$ (generally 24 hours), the nitric acid strip solution is loaded on TRU resin which selectively separates Ac from Ra. The $^{228}Ac$ is then recovered for counting from the TRU resin by elution with 1M HCl.

EXAMPLES

1. Synthesis and Purification of Bis-2-Ethylhexyl Methanediphosphonic Acid

A. Synthesis of Bis-2-Ethylhexyl Methanediphosphonic Acid

The compound bis-2-ethylhexyl methanediphosphonic acid was prepared by the phosphonic acid esterification method of Burger, et al., *J. Am. Chem. Soc.* 79:3575 (1957). Briefly, methanediphosphonic acid (30 g, 0.1704 mol) and 2-ethylhexanol (44.38 g, 0.3408 mol) were heated to boiling in tetrahydrofuran (600 mL), with stirring and reflux under a nitrogen atmosphere. Dicyclohexylcarbodiimide (77.80 g, 0.377 mol; solution in 340 mL tetrahydrofuran) was added dropwise to the refluxing solution over a period of several hours. The solution was kept at gentle reflux for about three days. The resulting solution was cooled, filtered, and vacuum filtered to remove the dicyclohexyl urea side product. The tetrahydrofuran solvent was removed by rotary evaporation.

B. Purification of Bis-2-Ethylhexyl Methanediphosphonic Acid

After rotary evaporation to remove solvent, the crude bis-2-ethylhexyl methanediphosphonic acid, was dissolved in 1M ammonium hydroxide (about one liter) and warmed to 90° C. This solution was filtered by vacuum filtration, and then acidified with 6M HCl to pH 1 to release the product as an oil. Dichloromethane was added to the acidified aqueous solution to extract the product. The dichloromethane solution containing the product was washed with 2M NaCl to remove traces of HCl solution.

The resulting amber brown dichloromethane solution of the bis-2-ethylhexyl methanediphosphonic acid showed some side products in the $^1H$ NMR analysis. The product was redissolved in 1N ammonium hydroxide and washed three times with 400 mL portions of dichloromethane. The basic aqueous phase containing the desired bis-2-ethylhexyl methanediphosphonate was acidified to pH/1 with 6M HCl. The bis-2-ethylhexyl methanediphosphonic acid was then extracted into dichloromethane solution. The dichloromethane solution was washed with 2M NaCl. The dichloromethane solvent was removed from the substantially pure bis-2-ethylhexyl methanediphosphonic acid by rotary evaporation, yielding 56.87 g of product (83.4 percent yield). $^{31}P$ NMR showed a characteristic peak at 20.01 ppm with 85 percent $H_3PO_4$ as a reference.

2. Use of Bis-Alkyl Methanediphosphonic Acid for Liquid-Liquid Extraction of Metal Ions An acidic aqueous solution of the metal ion to be extracted is brought into contact with a solution of bis-2-ethylhexyl methanediphosphonic acid in xylene solvent. The solutions are maintained in contact for a period of time sufficient for the metal ions in the aqueous solution to be extracted into the organic phase. The extractant (the diphosphonic acid xylene solution) is then separated from the acidic aqueous solution, thereby separating the metal ions from the aqueous solution.

3. Chromatographic Materials Using Bis-Alkyl Methanediphosphonic Acid

A chromatographic separation column was prepared using as support material Amberlite XAD-7 resin (manufactured by Rohm & Haas, Philadelphia, Pa.) treated in a conventional manner to remove all traces of preservatives (for example, see U.S. Pat. No. 4,835,107, which is incorporated by reference herein). Purified support material (0.6 g) was slurried in isopropyl alcohol and bis-2-ethylhexyl methanediphosphonic acid (0.4 g) was added. After stirring gently, the isopropyl alcohol was removed under vacuum at 55° C. to yield the bis-ethylhexyl methanediphosphonic acid dispersed on the resin support.

To prepare the chromatographic column, a portion of the resin material is slurried in dilute aqueous acid solution and aliquots of the slurry transferred by pipette to a glass column equipped with chemically inert polypropylene fittings. When the desired bed height is reached, the resin material is rinsed with several bed volumes of the solvent used to make the slurry.

4. Use of Bis-Alkyl Methanediphosphonic Acid Coated Onto Resinous Material for Extraction of Metal Ions A. Extraction of Actinides from Samples Containing Siliceous Material Actinides are extracted from fecal samples that contain siliceous material using resin support particles coated with bis-2-methylhexyl methanediphosphonic acid. A five gram homogenized soil sample is ashed overnight in an alumina crucible to remove organics. After cooling, the ashed sample is mixed with solid flakes of NaOH, in the ratio of 4 grams NaOH per gram of original soil sample. The sample is then placed in a muffle furnace and heated to 500° C. for two to three hours. After cooling, 100 mL of deionized water is added to dissolve the excess NaOH as well as any sodium aluminate and sodium silicate.

Two milliliters of a mixed reducing solution consisting of ferrous ammonium sulfate hexahydrate (0.3 g) and sodium formaldehyde sulfoxylate (0.3 g) is added together with the 100 mL of water to ensure that no hexavalent actinides are present. The mixture of water, fused soil and excess NaOH is stirred for approximately 60 minutes.

The resulting mixture is separated by centrifugation and the insoluble residue (mostly ferric hydroxide) is washed first with 0.5M NaOH and then deionized water. The supernatant liquid and the washings are discarded. Any actinides present in the soil are coprecipitated with the insoluble hydroxides. The insoluble hydroxides are dissolved in an excess of 6M HCl (about 50 mL) and diluted with 1–2M HCl (50 mL).

Any trivalent iron present, which is evident by its intense yellow color, is reduced with ascorbic acid until the solution is colorless (or a faint green). The ascorbic acid can be added as a freshly prepared 0.8M solution or as a solid.

The resulting solution may contain colloidal silica that may plug the bis-2-ethylhexyl methanediphosphonic acid separation particle column. To remove the colloidal silica, a 0.002M solution of polyethylene glycol-2000 (PEG-2000) is added with mixing and then allowed to stand. The colloidal silica is flocculated by the PEG-2000. After setting, the floc is removed by centrifugation.

The supernatant solution resulting from the separation of the silica floc is made 1M HF, and then passed through a two to three millimeter bed volume bis-2-ethylhexyl methanediphosphonic acid-coated separation particle column (preconditioned with 1M HCl). The column is operated at a flow rate of 1 to 2 mL/cm/min. After loading, the column is rinsed with 5 bed volumes of 1M HCl - 1M HF, followed by 5 bed volumes of 1M HCl.

After rinsing, the bis-2-ethylhexyl methanediphosphonic acid separation particle column is eluted with 5 bed volumes of isopropanol followed by 2 bed volumes of 6M HCl. The alcohol and HCl eluant (containing the bis-2-ethylhexyl methanediphosphonic acid) is collected in a 100 mL beaker and evaporated to near dryness. The residue is oxidized with 30 percent $H_2O_2$. Portions of hydrogen peroxide (5 mL) and one portion of 0.2M sodium vanadate (50 µL) are added to the residue. Generally four portions of peroxide are sufficient to destroy the stationary phase (containing bis-2-ethylhexyl methanediphosphonic acid), which was stripped from the column by the isopropanol.

B. Extraction of Actinides From Fecal Sample Containing Siliceous Material

Actinides are extracted from fecal samples that contain siliceous material using resin support particles coated with bis-2-methylhexyl methanediphosphonic acid. A one day collection of homogenized fecal sample is ashed overnight in an alumina crucible to remove organics. After cooling, the ashed sample is mixed with solid flakes of NaOH, in the ratio of 4 grams NaOH per gram of ashed fecal sample. The sample is then placed in a muffle furnace and heated to 500° C. for two to three hours. After cooling, 100 mL of deionized water is added to dissolve the excess NaOH as well as any sodium aluminate and sodium silicate.

Two milliliters of a mixed reducing solution consisting of ferrous ammonium sulfate hexahydrate (0.3 g) and sodium formaldehyde sulfoxylate (0.3 g) is added together with the 100 mL of water to ensure that no hexavalent actinides are present. The mixture of water, ashed material and excess NaOH is stirred for approximately 60 minutes.

The resulting mixture is separated by centrifugation and the insoluble residue (mostly ferric hydroxide) is washed first with 0.5M MaOH and then deionized water. The supernatant liquid and the washings are discarded. Any actinides present in the sample are coprecipitated with the insoluble hydroxides. The insoluble hydroxides are dissolved in an excess of 6M HCl (about 50 mL) and diluted with 1–2M HCl (50 mL).

Any trivalent iron present, which is evident by its intense yellow color, is reduced with ascorbic acid until the solution is colorless (or a faint green). The ascorbic acid can be added as a freshly prepared 0.8M solution or as a solid.

The resulting solution may contain colloidal silica that may plug the bis-2-ethylhexyl methanediphosphonic acid separation particle column. To remove the colloidal silica, a 0.002M solution of polyethylene glycol-2000 (PEG-2000) is added with mixing and then allowed to stand. The colloidal silica is flocculated by the PEG-2000. After setting, the floc is removed by centrifugation.

The acidic supernatant liquid obtained after separating the silica floc is loaded onto the bis-2-ethylhexyl methanediphosphonic acid separation particle column. After passing the load solution through the column, the column is rinsed successsively with 5 bed volumes of 2M HCl, and 5 bed volumes of 1M HCl and 1M HF. The remainder of the procedure is identical to that described for soils, in Example 4A.

C. Batch Treatment with Resin for Metal Removal

As an alternative to the procedure above using a column of bis-2-ethylhexyl methanediphosphonic acid-coated resin separation particles, the resin separation particles are added to the acidic solution containing actinides, and stirred for a sufficient time for actinides to become bound. Then the resin is removed (for example, by filtration). The actinides from the sample remain associated with the resin, separated from the acidic solution.

5. Recovery of Associated Actinides from Resin

A. Destruction of the Bis-2-Ethylhexyl Methanediphosphonate

A column (10 mL) containing actinide ions bound to bis-2-ethylhexyl methanediphosphonic acid-coated resin particles is washed to remove the bis-2-ethylhexyl methanediphosphonic acid from the resin particles with 5 bed volumes of isopropyl alcohol followed by 2 bed volumes of 6M HCl. The isopropyl alcohol and water solvents are removed by evaporation, leaving a residue of a very small volume of bis-2-ethylhexyl methanediphosphonic acid actinide complex. The bis-2-ethylhexyl methanediphosphonic acid is oxidized to phosphoric acid by addition of portions of hydrogen peroxide (30 percent, 5 mL each) and sodium vanadate (0.2M, 50 $\mu$L). Generally four portions of peroxide and one portion of sodium vanadate are sufficient to destroy the stationary phase (containing bis-2-ethylhexyl methanediphosphonic acid), which was stripped from the column by the isopropanol. The actinides can then be quantitatively recovered from the resulting residue. For example, the resulting phosphoric acid residue containing actinides is dissolved in nitric acid, and loaded onto an actinide specific extraction chromatographic column, such as TRU™ resin (U.S. Pat. No. 4,835,107).

B. Elution of Radium from Bis-2-Ethylhexyl Methanediphosphonic Acid Resin

Radium (Ra) can be recovered from bis-2-ethylhexyl methanediphosphonic acid resin column by stripping with 1M HCl or 1M $HNO_3$.

6. Use Of Bis-2-Ethylhexyl Methanediphosphonic Acid For Quantitative Analysis of $^{226}$Ra and $^{228}$Ra $^{228}$Ra is a beta emitter that decays to $^{228}$Ac with a half-life of 6.13 hours, whereas $^{226}$Ra is an alpha emitter with a half-life of about 1600 years. A mixture of $^{228}$Ra, $^{226}$Ra, and the decay product $^{228}$Ac is bound by a column containing bis-2-ethylhexyl methanediphosphonic acid-coated resin substrate particles. At time called zero, the column is stripped with 1M to 2M nitric acid, which causes the $^{228}$Ra and $^{226}$Ra to elute from the column while the $^{228}$Ac remains bound to the column.

The amount of total Ra in the eluant is measured. The $^{228}$Ra in the eluant decays to $^{228}$Ac. After the $^{228}$Ac is in secular equilibrium with the Ra (generally 24 hours) the nitric acid strip is loaded onto TRU™ resin, which selectively separates the $^{228}$Ac from Ra. The $^{228}$Ac is then recovered for counting from the TRU™ resin by elution with 4M hydrochloric acid. The amount of $^{228}$Ra in the sample can be calculated from the amount of $^{228}$Ac formed in the known amount of time with the known decay half-life, and the remainder of the Ra is $^{226}$Ra.

7. Binding of Various Radioisotopes by Bis-2-Ethylhexyl Methanediphosphonic Acid-Coated Resin Support Particles The sorption of various radioisotopes at tracer level concentration from hydrochloric acid solutions by bis-2-ethylhexyl methanediphosphonic acid-coated resin support particles was measured in batch experiments at room temperature (24.1° C.). A known volume (typically 1.00 mL) of the aqueous solution containing tracer, measured with calibrated automatic pipetters, was equilibrated in a plastic test tube with a weighed amount of the resin (typically from 1 to 10 mg). Efficient mixing of the solid and liquid phase was obtained using magnetic microbars (1.5×8 mm) rotated at about 200 rpm, which was more than sufficient to prevent the resin particles from settling. A one hour mixing time was used, which is more than that required for equilibrium attainment. Preliminary kinetic experiments have shown that metal uptake equilibrium is attained after about 20 minutes. After centrifugation, an aliquot of the solution was withdrawn from the test tube and filtered using a syringe equipped with a polyvinylidene difluoride membrane filter (0.2 micron pore size) and a Luer lock (Whatman Laboratory Division, Whatman, Inc., Clifton, N.J.). Counting of aliquots of the filtered aqueous phase was performed with a Packard Cobra Autogamma counter (for gamma emitters) or via liquid scintillation on a Packard Model 2000 CA counter (for alpha and beta emiteers).

In the experiments involving $Al^{+3}$, $Bi^{+3}$, and $Ti^{+4}$, the analyses of the metal concentrations in solution before and after contact with the resin were performed by ICP-AES (inductively coupled plasma atomic emission spectroscopy).

Weight distribution ratios, D, were calculated as $$D = \frac{(A_f)(V)}{(A_o - A_f)(W)}$$

where $A_o$ and $A_f$ are the aqueous phase activity (cpm) before and after equilibration, respectively. The weight of the resin (g) is w and V is the volume of the aqueous phase (mL). When very high values of D were expected, the amount of resin used in the uptake experiments was as small as practically possible (0.1–0.2 mg) in order to have a still measurable, although very low, activity left in the aqueous phase. However, even when a fraction of a milligram of the resin was used in the experiments, the saturation of the resin with metal ions was never reached, because the metal concentration was always at tracer level. Duplicate and, in some cases, triplicate experiments showed that the reproducibility of the D measurements was generally within 10 percent for values up to $10^4$. Above this value, the higher the D, the lower was the reproducibility, up to an uncertainty interval of about 50 percent for the highest D values.

The D values measured in the uptake studies with the bis-2-ethylhexyl methanediphosphonate-coated resin support particles were converted into k' values by dividing by 1.94, where k' is the capacity factor (the number of free column volumes to peak maximum). This factor includes the conversion of the weight distribution ratios to volume distribution ratios, and the value of the ratio of the volume of stationary phase to the volume of mobile phase, $v_s/v_m$, which for the bis-2-ethylhexyl methanediphosphonate-coated resin support particles has been determined to be equal to 0.196. The above conversion also requires the knowledge of the density of the extractant (1.05 g/mL) and the density of the methanediphosphonic acid-coated resin (1.11 g/mL).

Table I shows the capacity of the bis-2-ethylhexyl methanediphosphonic acid-coated resin for various metals.

TABLE I

| Capacity Metal | Capacity mmol/g res | Capacity mmol/ml bed | Capacity mg/g res | mg/ml bed |
|---|---|---|---|---|
| Th(IV) | 0.371 | 0.131 | 86.1 | 30.3 |
| U(VI) | 0.612 | 0.612 | 145.7 | 51.3 |
| Nd(III) | 0.315 | 0.315 | 45.4 | 16.0 |
| Fe(III) | 0.575 | 0.575 | 32.1 | 11.3 |
| Ca(II) | 0.369 | 0.369 | 45.0 | 15.8 |
| Ba(II) | 0.328 | 0.328 | 45.0 | 15.8 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed is:

1. A process for separating elements selected from the group consisting of trivalent, tetravalent and hexavalent actinide and lanthanide cations, and radium cations from an aqueous solution that comprises the steps of:

(a) contacting a cation-containing solution with a plurality of solid extractant particles, said solid extractant particles comprising solid support particles that do not react under the conditions of separation and having adsorbed thereon a diesterified methanediphosphonic acid extractant;

(b) maintaining said contact for a time period sufficient for said extractant to bind to the cations of said elements present in said aqueous liquid and form a second aqueous liquid phase that is relatively depleted of said cations of said elements; and (c) separating the solid and liquid phases.

2. The process according to claim 1 wherein said solid extractant particles are present in a chromatographic column.

3. The process according to claim 1 wherein both of said aqueous phases of a pH value of about 2 or less.

4. The process according to claim 1 wherein said extractant is bis-2-ethylhexyl methanediphosphonic acid.

5. The process of claim 1 wherein radium cations are in said aqueous solutions and separated in said second aqueous liquid phase from said extractant-bound cation containing phase.

6. The process of claim 1 wherein lanthanide cations are in said aqueous solutions and separated in said second aqueous liquid phase from said extractant-bound cation containing phase.

* * * * *